United States Patent [19]

van Dierendonck et al.

[11] 3,929,911

[45] Dec. 30, 1975

[54] PREPARATION OF A PHENOL FROM A BENZENEMONOCARBOXYLIC ACID

[75] Inventors: Laurentius L. van Dierendonck; Johan P. H. Von den Hoff, both of Geleen, Netherlands

[73] Assignee: Stamicarbon N.V., Geleen, Netherlands

[22] Filed: Jan. 18, 1971

[21] Appl. No.: 106,958

[30] Foreign Application Priority Data

Jan. 17, 1970 Netherlands ....................... 7000685

[52] U.S. Cl. ............................................ 260/621 R
[51] Int. Cl.² .......................................... C07C 37/00
[58] Field of Search ..................... 260/621 G, 621 R

[56] References Cited
UNITED STATES PATENTS

| | | | |
|---|---|---|---|
| 3,277,184 | 10/1966 | Ryland et al. | 260/621 G |
| 3,349,134 | 10/1967 | Blom et al. | 260/621 G |
| 3,356,744 | 12/1967 | Woodward | 260/621 G |
| 3,365,503 | 1/1968 | Forni et al. | 260/621 G |
| R24,848 | 12/1955 | Kaeding et al. | 260/621 R |

*Primary Examiner*—Norman Morgenstern
*Attorney, Agent, or Firm*—Cushman, Darby & Cushman

[57] ABSTRACT

An improved process for continuous production of a phenol by pyrolytic oxidation and decarboxylation of a benzenemonocarboxylic acid in the presence of dissolved copper followed by hydrolysis of the intermediate reaction mixture from the oxidation and decarboxylation step, wherein the intermediate reaction mixture from the oxidation and decarboxylation step is fed together with steam and a sufficient quantity of molecular oxygen to a hydrolysis zone whereby the copper in the reaction mixture is maintained in solution during the hydrolysis step by maintaining the copper in a bivalent oxidation state.

4 Claims, 1 Drawing Figure

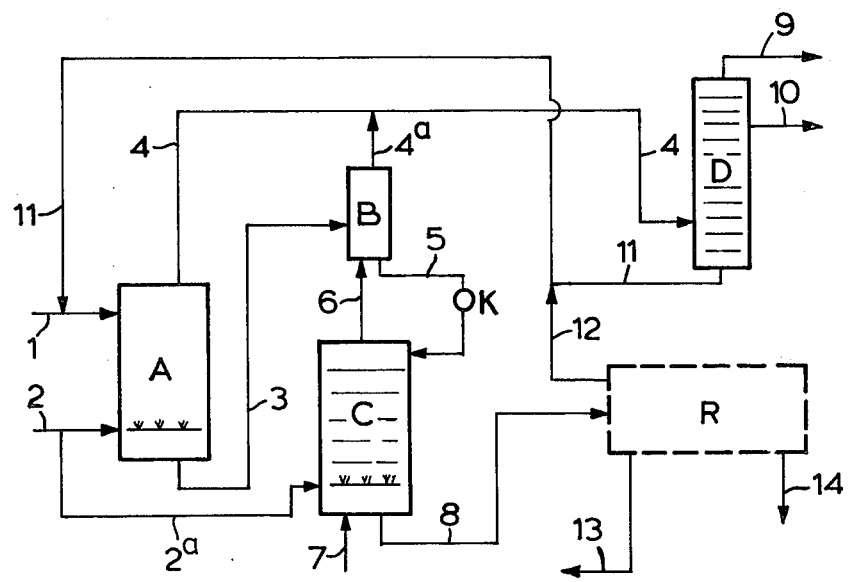

PREPARATION OF A PHENOL FROM A BENZENEMONOCARBOXYLIC ACID

The invention relates to an improved process for the preparation of a phenol by oxidation of a benzenemonocarboxylic acid compound comprising benzoic acid, substituted benzoic acid, anhydrides, esters and salts derived from benzoic acid and substituted benzoic acid with subsequent hydrolysis of esters formed in the oxidation zone.

Processes have been described in the prior art for the pyrolytic oxidation and decarboxylation of a benzenemonocarboxylic acid in the liquid state with oxygen or a gas mixture containing oxygen in the presence of copper or a combination of copper and magnesium which are dissolved in the liquid reaction medium. Esters are produced in the oxidation and decarboxylation reactions, which upon hydrolysis yield the desired phenol.

In the pyrolytic oxidation and decarboxylation step, tarry by-products are produced by side reactions, and upon completion of the hydrolysis step there remains a solution containing the unconverted carboxylic acid, the metallic salts and the tarry by-products. It is economically desirable to recover the metallic salts and the unconverted carboxylic acid which can be recycled to the oxidation and decarboxylation step. The tarry by-products are separated and discarded, usually by combustion thereof.

It has been proposed to hydrolyze the ester formed in the oxidation zone by contacting either the entire reaction mixture or the ester component which has been separated from said mixture with an aqueous solution of an acid or base (see for example U.S. Pat. No. 2,762,838). This process, however, produces a phenol dissolved in an aqueous solution, which is contaminated with other substances.

It has also been proposed to effect the hydrolysis of the ester formed in the oxidation zone by passing steam through the reaction mixture either during the oxidation or in a separate hydrolysis reactor subsequent to the oxidation (see for example Dutch Patent Specification No. 90,684 corresponding to U.S. Pat. reissue 24,848) However, precipitation of copper and copper compounds occurs in the apparatus in which the hydrolysis reaction occurs resulting in rapid fouling of the apparatus and a loss of valuable copper. Intermediate separation of the copper from the oxidation reaction mixture prior to hydrolysis might be considered. Such an expedient might eliminate fouling of the hydrolysis apparatus but increases the complexity of the process because the copper separation must be accomplished at a temperature which is appreciably lower than the temperature of the reaction mixture coming from the oxidation reactor and lower than the temperature of the reaction medium in the hydrolysis reaction. Thus, the reaction mixture from the oxidation step has to be cooled, and then reheated after the copper has been removed and prior to hydrolysis.

According to the present invention, the pyrolytic oxidation and decarboxylation of a benzenemonocarboxylic acid is performed as taught in the prior art. The reaction mixture from the oxidation and decarboxylation step is then withdrawn from the oxidation zone and introduced into a hydrolysis zone through which steam is passed at a temperature between about 190°C. and 210°C., preferably about 200°C. Oxygen or a gas mixture containing molecular oxygen is also introduced to the hydrolysis zone to maintain the copper present in the hydrolysis zone in a bivalent oxidation state. The bivalent copper remains in solution in the reaction mixture and does not precipitate. The esters present in the reaction mixture are thus rapidly hydrolyzed without precipitation of copper or of a copper compound. The required quantity of oxygen in the hydrolysis reactor is small and depends on the amount of copper contained in the reaction mixture and on variations in the temperature of the reaction mixture. As a rule, 1 to 2.5 percent of the quantity of oxygen-containing gas mixture (preferably air), which is utilized in the oxidation zone, will suffice.

The phenol produced by the hydrolysis reaction can in turn react with the cupric salt of the benzenemonocarboxylic acid used, forming undesirable by-products which, in turn, are converted into tarry products. It has been found that an optimum condition is achieved by maintaining the temperature in the hydrolysis zone at about 200°C. whereupon the hydrolysis reaction still proceeds rapidly with the undesired side-reactions being virtually suppressed.

The phenol produced during the hydrolysis reaction is in a vapor state and leaves the hydrolysis zone together with part of the unconverted carboxylic acid, steam, and oxygen containing gas. The phenol can be easily recovered from this vapor mixture in a conventional manner, e.g., by distillation. The residue remaining in the hydrolysis reactor comprises a mixture of unconverted carboxylic acid, metallic salts and tarry products. This residue can be discharged periodically or continuously and processed by conventional processes to recover valuable products, such as the carboxylic acid and the metallic salts. The tar is separated and discharged from the system. Both the oxidation and the hydrolysis reactions can be carried out at atmospheric as well as at elevated pressures.

In an alternative mode of operation according to the present invention, the reaction mixture can be processed in an evaporator prior to entering the hydrolysis zone. In the evaporator, part of the unconverted carboxylic acid is withdrawn from the reaction mixture as a vapor, and thus, the volume of the reaction mixture is reduced and less carboxylic acid need be separated off when processing the residue from the hydrolysis reaction.

The process according to the present invention offers several advantages over the prior art process for the preparation of phenol in which air and steam are simultaneously passed through a combined oxidation-and-hydrolysis reactor. Prior art process requires a large reactor for simultaneous introduction of air for oxidation and steam for hydrolysis. The amount of steam required is very large because the steam is not only required for the hydrolysis reaction, but also for the stripping of the phenol from the reaction mixture as rapidly as possible to minimize the side reaction between phenol and copper salts. The entire reaction mixture must be intensively contacted with the steam and even then the side reaction between phenol and copper salts can not be entirely prevented.

The process of the present invention can utilize a smaller oxidation reactor in comparison to the prior art process, because of the lower gas load. The amount of steam required in the hydrolysis zone of the present invention is smaller than that of the prior art process because only enough steam for the hydrolysis is necessary as the phenol need not be rapidly stripped from the reaction mixture. By constructing the hydrolysis zone as a column, e.g. a tray-column, or as a cascade of small reactors, a minor steam quantity suffices to intensively contact the steam with the reaction mixture to be hydrolyzed.

The construction of the hydrolysis zone as a cascade of small reactors, in which case steam is blown into each of the reactors, moreover offers the advantage of the vaporous phenol being withdrawn from each reactor, so that a relatively high phenol concentration, as may occur in the top section of a column-shaped hydrolysis zone, does not occur.

Further, the reaction rate in the oxidation zone in the process of the present invention is improved with respect to that of the prior art process, as a result of which shorter residence times in the zone and, hence, a smaller reactor, will suffice.

The process of the present invention will be further described with reference to the FIGURE and the following example. The FIGURE demonstrates diagrammatically one preferred process according to the present invention. Referring now to the FIGURE, a melted benzoic acid with copper and magnesium-salts dissolved therein is added to reactor A through line 1, and air is added to reactor A through line 2. In the oxidation reactor A, which is kept at a temperature of between 230° and 240°C, some hydrolysis of the first-formed phenyl benzoate to phenol occurs due to the action of the water evolved during the oxidation reaction. At the prevailing temperature and the slightly elevated reaction pressure, the phenol formed is vaporous and leaves the reactor via line 4 along with the off-gases, some water vapor and benzoic acid. The liquid reaction mixture is continuously discharged through line 3, evaporator B, line 5, and a cooler K, to hydrolysis column C, where a temperature of 200°C. is maintained at an atmospheric pressure. Line 2a is used for the supply of a small quantity of air and line 7 for steam. The phenol liberated during the hydrolysis leaves the column through line 6, evaporator B and line 4a. A vapor mixture of phenol, benzoic acid, phenyl benzoate, water and off-gases is fed to column D through the lines 4 and 4a. This mixture is separated in column D into (1) off-gases, which are discharged via line 9 over the top, (2) phenol, discharged through line 10 on to a purification and storage section which is not included in the drawing, and (3) a bottom product of benzoic acid with some phenyl benzoate, which is returned to the oxidation reactor via line 11.

In hydrolysis column C, a bottom product, principally consisting of benzoic acid, copper and magnesium-salts and tar, is continuously discharged through line 8 to residue-processing section R, where it is separated in a conventional manner, for instance by extraction with water or organic solvents and by subsequent separation and purification, into (1) benzoic acid, which is recycled via the lines 12 and 11, (2) metallic salts, which may be recycled through line 13, and (3) tar, which is discharged from the system via line 14.

EXAMPLE

Benzoic acid (1000 kg), magnesium (10 kg) and copper (8 kg), both in the form of their salts, were added to an oxidation reactor and the mixture heated to a temperature being 230° – 234°C. Every hour 125 Nm³ of air were passed through the reactor and 544.5 kg of benzoic acid, 39.8 kg of magnesium benzoate, 13.7 kg of cupric benzoate and 13.9 kg of phenyl benzoate was introduced into the reactor.

Vapors were withdrawn from the reactor at a rate of 55 kg of carbon dioxide, 10.7 kg of water, 13.3 kg of phenyl benzoate, 51 kg of phenol and 140 kg of benzoic acid per hour. A portion of the reaction mixture was withdrawn at a rate of 362 kg/hour from the oxidation reactor and transferred to a hydrolysis column operating at a temperature of 200°C. Air at a rate of 3.2 kg per hour and steam at a rate of 22.9 kg per hour were also fed to the hydrolysis column. Phenol (49 kg/hr) and benzoic acid (193 kg/hour) were withdrawn from the hydrolysis reactor in the form of vapors. A mixture of 13.7 kg of cupric benzoate, 39.8 kg of magnesium benzoate, 1.0 kg of phenyl benzoate, 58.1 kg of benzoic acid and 15.7 kg of tar was discharged, as bottom product, per hour, from the hydrolysis column.

Benzoic acid was consumed at a rate of 152.8 kg/hour and converted to phenol which was produced at a rate of 106.5 kg/hour. The phenol efficiency, based on consumption of benzoic acid, was 90 percent.

Both the oxidation and the hydrolysis reactions can be carried out at atmospheric as well as at elevated pressure. Preferably, the oxidation reaction is carried out at pressures up to 2.5 atmospheres absolute and the hydrolysis conducted at atmospheric pressure. The temperatures employed in the oxidation reaction can vary between the range of about 200°C. to about 275°C., preferably from about 230°C. to about 240°C. The temperature employed in the hydrolysis zone can vary between the range of about 190°C. and 210°C., preferably at about 200°C.

The concentration of copper in the oxidation reaction can vary between 0.1 percent by weight and 3.0 percent by weight, preferably approximately 0.5 percent by weight, based on the weight of benzenemonocarboxylic acid. The magnesium concentration can vary from about 0.1 percent by weight to about 10 percent by weight, preferably between 1 percent by weight and 4 percent by weight, based on the weight of benzenemonocarboxylic acid.

What is claimed is:

1. In a process for the continuous preparation of a phenol by pyrolytic oxidation and decarboxylation of a benzenemonocarboxylic acid compound selected from the group consisting of benzoic acid, substituted benzoic acid, and esters, anhydrides and salts of benzoic acid and substituted benzoic acid comprising oxidizing said benzenemonocarboxylic acid compound in the liquid phase with molecular oxygen, in the presence of dissolved copper, forming an intermediate reaction mixture containing an ester product which is subsequently hydrolyzed to the phenol, the improvement comprising feeding the intermediate reaction mixture from the oxidation zone, together with steam at a temperature of approximately 200°C. to a hydrolysis zone and introducing into the hydrolysis zone sufficient molecular oxygen to maintain the copper in a bivalent state of oxidation in the reaction mixture, whereby the copper is maintained in solution in the reaction mixture during the hydrolysis step.

2. A process as claimed in claim 1, wherein the molecular oxygen is introduced by feeding air into the hydrolysis zone in a quantity of 1 to 2.5 percent of the air fed to the oxidation zone.

3. A process as claimed in claim 1, wherein the intermediate reaction mixture from the oxidation reaction is evaporated to remove a portion of the benzenemonocarboxylic acid from the reaction mixture prior to feeding the reaction mixture to the hydrolysis zone.

4. In a process for the continuous preparation of phenol by pyrolytic oxidation and decarboxylation of a benzenemonocarboxylic acid compound selected from the group consisting of benzoic acid, substituted benzoic acid, and esters, anhydrides and salts of benzoic acid, comprising oxidizing said benzenemonocarboxylic acid compound in the liquid phase with molecular oxygen and in the presence of dissolved copper thereby forming an intermediate reaction mixture containing an ester product and subsequently hydrolyzing the intermediate ester product to phenol, the improvement including avoiding the rapid fouling of the reaction area comprising (a) directing the intermediate reaction mixture formed in an oxidation zone to a separate hydrolysis zone, and (b) supplying with said intermediate reaction mixture to said hydrolysis zone steam at a temperature of approximately 200°C; (c) supplying to the hydrolysis zone sufficient molecular oxygen to maintain the copper contained in the intermediate reaction mixture in a bivalent state of oxidation and in a quantity of about 1 to 2.4 percent of the molecular oxygen fed into the oxidization zone, thereby maintaining said copper in solution in the reaction mixture in the hydrolysis zone, (d) separating the thus formed phenol in a substantially purified form from the reaction mixture by steam stripping, and (e) recovering the copper from the reaction mixture.

* * * * *